US008953631B2

(12) United States Patent
Naouri et al.

(10) Patent No.: US 8,953,631 B2
(45) Date of Patent: Feb. 10, 2015

(54) INTERRUPTION, AT LEAST IN PART, OF FRAME TRANSMISSION

(75) Inventors: Ygdal Naouri, Jerusalem (IL); Eliel Louzoun, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 271 days.

(21) Appl. No.: 12/827,956

(22) Filed: Jun. 30, 2010

(65) Prior Publication Data
US 2012/0002680 A1 Jan. 5, 2012

(51) Int. Cl.
*H04L 12/54* (2013.01)
*H04L 12/28* (2006.01)
*G06F 15/16* (2006.01)
*H04L 12/825* (2013.01)

(52) U.S. Cl.
CPC .................................. *H04L 47/263* (2013.01)
USPC ............ 370/428; 370/413; 370/414; 709/207

(58) Field of Classification Search
None
See application file for complete search history.

(56) References Cited

U.S. PATENT DOCUMENTS

| | | | | |
|---|---|---|---|---|
| 5,559,963 A | * | 9/1996 | Gregg et al. | 709/234 |
| 5,574,934 A | * | 11/1996 | Mirashrafi et al. | 709/207 |
| 6,005,849 A | * | 12/1999 | Roach et al. | 370/276 |
| 6,279,050 B1 | * | 8/2001 | Chilton et al. | 710/20 |
| 6,317,430 B1 | * | 11/2001 | Knisely et al. | 370/394 |
| 6,434,165 B1 | * | 8/2002 | Sherer et al. | 370/465 |
| 6,487,212 B1 | * | 11/2002 | Erimli et al. | 370/413 |
| 6,529,476 B1 | * | 3/2003 | Magnussen | 370/235 |
| 7,444,331 B1 | * | 10/2008 | Nachenberg et al. | 1/1 |
| 7,529,271 B2 | * | 5/2009 | Forssell | 370/469 |
| 7,606,958 B2 | * | 10/2009 | Sasage | 710/260 |
| 2002/0167945 A1 | * | 11/2002 | Shin et al. | 370/389 |
| 2004/0085902 A1 | | 5/2004 | Miller et al. | |
| 2004/0205228 A1 | * | 10/2004 | Rose et al. | 709/236 |
| 2005/0076245 A1 | * | 4/2005 | Graham et al. | 713/201 |
| 2005/0193429 A1 | * | 9/2005 | Demopoulos et al. | 726/23 |
| 2005/0204263 A1 | * | 9/2005 | Ricci | 714/758 |
| 2007/0058566 A1 | * | 3/2007 | Frederiks et al. | 370/253 |
| 2007/0271401 A1 | * | 11/2007 | Louzoun et al. | 710/264 |

(Continued)

FOREIGN PATENT DOCUMENTS

CN 101449254 A 6/2009
JP 10-056478 A 2/1998

(Continued)

OTHER PUBLICATIONS

"Virtual Bridged Local Area Networks—Amendment: Congestion Notification", IEEE P802.1Qau/D2.5, Draft Standard for Local and Metropolitan Area Networks, Prepared by the Data Center Bridging Task Group of IEEE 802.1, Dec. 18, 2009, pp. 1-120.

(Continued)

*Primary Examiner* — Marsha D Banks Harold
*Assistant Examiner* — Christopher Wyllie
(74) *Attorney, Agent, or Firm* — Christopher K. Gagne

(57) ABSTRACT

An embodiment may include circuitry to permit interruption, at least in part, of a first frame from a sender to an intended recipient in favor of transmitting, at least in part, a payload of a second frame from the sender to the intended recipient, and/or processing, at least in part, one or more incoming flow control notifications. The payload may be transmitted, at least in part, to the intended recipient in one or more frame fragments. Many modifications, variations, and alternatives are possible without departing from this embodiment.

22 Claims, 7 Drawing Sheets

(56) References Cited

U.S. PATENT DOCUMENTS

| | | | |
|---|---|---|---|
| 2008/0028113 A1 | 1/2008 | Guo et al. | |
| 2008/0062897 A1* | 3/2008 | Loffink et al. | 370/294 |
| 2008/0071924 A1* | 3/2008 | Chilukoor | 709/240 |
| 2008/0080370 A1 | 4/2008 | Willey | |
| 2008/0273545 A1* | 11/2008 | Sgouros et al. | 370/412 |
| 2009/0070880 A1* | 3/2009 | Harris et al. | 726/25 |
| 2010/0027423 A1 | 2/2010 | Bauman et al. | |
| 2011/0239116 A1* | 9/2011 | Turner et al. | 715/705 |
| 2011/0305217 A1* | 12/2011 | Seok | 370/329 |
| 2012/0002680 A1* | 1/2012 | Naouri et al. | 370/428 |
| 2013/0016724 A1 | 1/2013 | Thaler | |
| 2013/0246828 A1* | 9/2013 | Naouri et al. | 713/340 |

FOREIGN PATENT DOCUMENTS

| | | |
|---|---|---|
| JP | 2000-183961 A | 6/2000 |
| JP | 2006-128859 A | 5/2006 |
| KR | 10-1453182 | 10/2014 |
| RU | 2 371 855 C2 | 10/2009 |
| WO | 01/05096 A1 | 1/2001 |
| WO | 2007/140324 A2 | 12/2007 |
| WO | 2012003288 A2 | 1/2012 |
| WO | 2012/003288 A3 | 4/2012 |

OTHER PUBLICATIONS

"Virtual Bridged Local Area Networks—Amendment XX: Enhanced Transmission Selection for Bandwidth Sharing Between Traffic Classes", IEEE P802.1Qaz/D1.2, Draft Standard for Local and Metropolitan Area Networks, Prepared by the Data Center Bridging Task Group of IEEE 802.1, Mar. 1, 2010, pp. 1-84.

"Virtual Bridged Local Area Networks—Amendment:Priority-based Flow Control", IEEE P802.1Qbb/D1.3, Draft Standard for Local and Metropolitan Area Networks, Prepared by the Data Center Bridging Task Group of IEEE 802.1, Feb. 10, 2010, pp. 1-41.

"Virtual Bridged Local Area Networks", IEEE Standard for Local and metropolitan area networks, IEEE Computer Society, IEEE Std 802.1Q™-2005, May 19, 2006, pp. 1-303.

"Part 3: Carrier Sense Multiple Access with Collision Detection (CSMA/CD) access method and Physical Layer specifications", IEEE Standard for Information technology—Telecommunications and information exchange between systems—Local and metropolitan area networks—Specific requirements, 2008 IEEE, pp. 1-790.

"Data center bridging—Wikipedia, the free encyclopedia", retrived on May 6, 2010, pp. 1-6, available at: http://en.wikipedia.org/wiki/Data_center_bridging.

"Unified Fabric White Paper—Fibre Channel over Ethernet (FCoE)", Cisco Systems, pp. 1-24, available at: http://www.cisco.com/en/US/docs/solutions/Enterprise/Data_Center/UF_FCoE_final.pdf, Cisco Systems, 2009.

"Priority Flow Control: Build Reliable Layer 2 Infrastructure", White Paper, 2009, Cisco Systems, Inc., pp. 1-8.

PCT Search Report and Written Opinion from corresponding International application No. PCT/US2011/042548, filed Jun. 30, 2011; Search Report and Written Opinion mailed Feb. 17, 2012; 9 pages.

Office Action received for Korean Patent Application No. 10-2012-7031842, mailed on May 16, 2014, 2 pages of English Translation and 2 pages of Korean Office Action.

Office Action received for Japanese Patent Application No. 2013-515589, mailed on Jun. 3, 2014, 3 pages of Office Action including 2 pages of translation.

International Preliminary Report on Patentability and Written Opinion received for PCT Patent Application No. PCT/US2011/042548, mailed on Jan. 8, 2013, 5 pages.

Office Action received for Japanese Patent Application No. 2013-515589, mailed on Dec. 10, 2013, 3 pages of Office Action Including 2 pages of English Translation.

Abstract and Translation of Japanese Patent Application Publication No. 10-056478, published on Feb. 24, 1998, 10 pages.

Abstract and Translation of Japanese Patent Application Publication No. 2000-183961, published on Jun. 30, 2000, 6 pages.

Abstract and Translation of Japanese Patent Application Publication No. 2006-128859, published on May 15, 2006, 14 pages.

Office Action Received for Korean Patent Application No. 10-2012-7031842, mailed on Jan. 22, 2014, 5 pages of Office Action and 4 pages of English Translation.

Office Action received for Russian Patent Application No. 2012157525, mailed on Jun. 2, 2014, 3 pages of English Translation and 4 pages of Russian Office Action.

Office Action recieved for Chinese Patent Application No. 201180027671.1, mailed on Sep. 28, 2014, 6 pages of English Translation and 7 pages of Chinese Office Action.

Decision for Grant recieved for Japanese Patent Application No. 2013-515589, mailed on Sep. 9, 2014, 1 page of English Translation and 1 page of Decision for Grant.

Notice of Allowance recieved for Russian Federation Patent Application No. 2012157525, mailed on Oct. 9, 2014, 11 pages of English Translation and 19 pages of Notice Allowance.

* cited by examiner

FIG. 3

INTERRUPTION, AT LEAST IN PART, OF FRAME TRANSMISSION

FIELD

This disclosure relates to interruption, at least in part, of the transmission of a frame.

BACKGROUND

One conventional converged Ethernet network arrangement supports transmission of different classes of network traffic in the network. For example, two such classes may be low latency traffic and bulk traffic, respectively. The ratio of low latency traffic to bulk traffic intended to be carried by the network may be preset, for example, to a ratio of 80 percent bulk traffic to 20 percent low latency traffic. The transmission of low latency traffic may be distributed in time, with the transmission of a respective low latency frame occurring after the transmission of a respective bulk frame.

In this conventional arrangement, each frame usually traverses multiple hops before arriving at its ultimate destination. At each such hop, the transmission of a received low latency frame is queued (and thereby, delayed) until a transmission slot, after the transmission of a bulk frame, becomes available. Statistically, this queuing delay, at each respective hop, for a respective low latency frame can be shown to be equal to about half of the time involved in transmitting an average sized bulk frame. This can significantly delay the reception of a given low latency frame at the intended ultimate recipient. Further exacerbating this problem is the fact that most bulk frames consist of jumbo frames that can be much larger than a given low latency frame.

Additionally, if it is desired not to drop frames in the network, and the network implements flow control techniques to pause frame transmission, then each hop in the network should be allocated sufficient buffer memory to store, under the worst expected latency conditions, incoming frames, until its corresponding link partner receives and carries out the command to enter the paused state. The above issues increase the amount of latency that may be expected in this conventional arrangement, and therefore, also increase the amount of buffer memory to be allocated in this conventional arrangement. Unfortunately, since these considerations are concerned with addressing potential worst case latency conditions, and such conditions are unlikely often to occur, most of time the majority of this buffer memory actually will be empty (e.g., not actively used to store incoming frames). This is wasteful of memory resources.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which:

FIG. 3 illustrates features of certain types of frame fragments in an embodiment.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
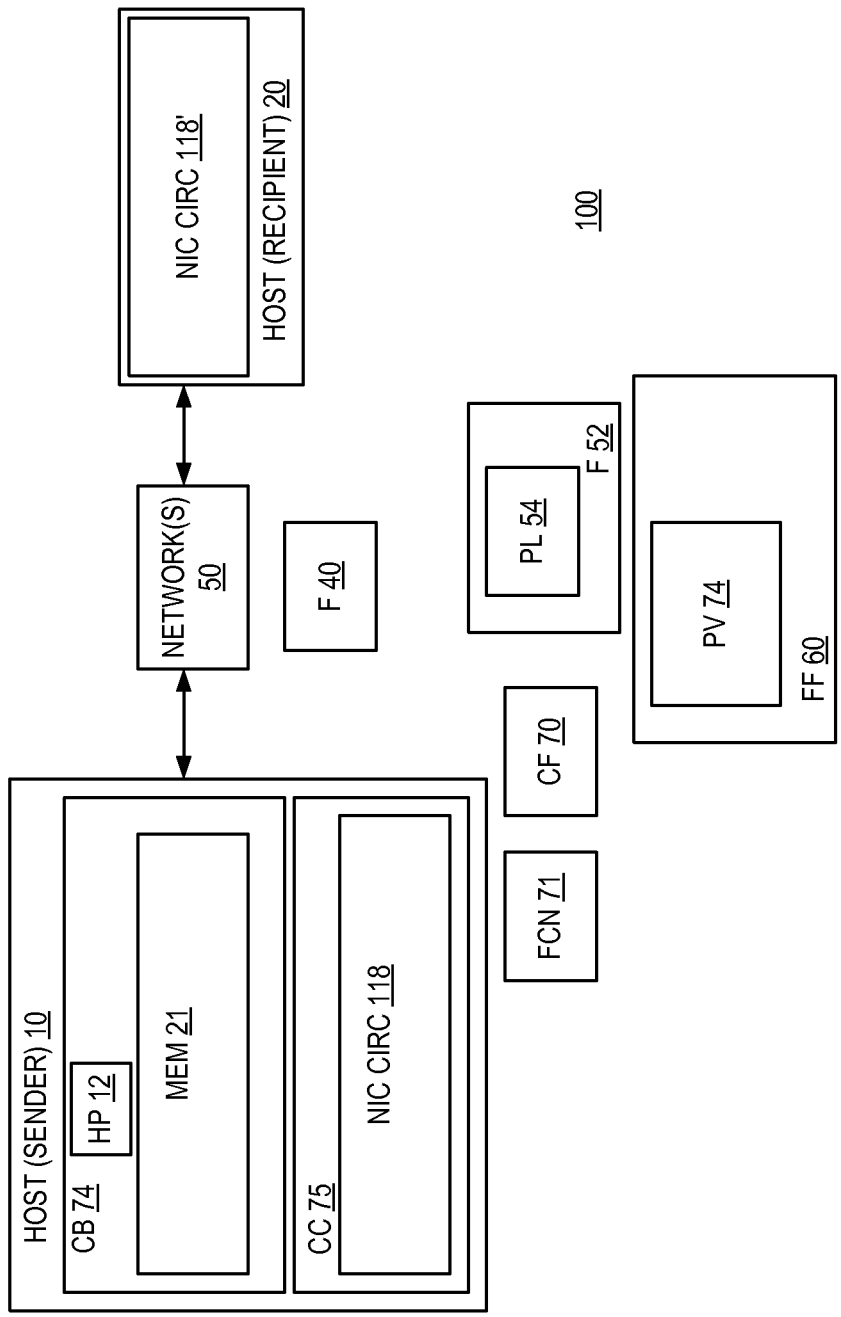
FIG. 1 illustrates a system embodiment.

FIG. 1 illustrates a system embodiment 100. System 100 may include host 10 that may be communicatively coupled to host 20 via one or more wireless and/or wired networks 50. Each of the hosts 10 and 20 may be geographically remote from each other. In an embodiment, the terms "host computer," "host," "server," "client," "network node," "end station," "intermediate station," and "node" may be used interchangeably, and may mean, for example, without limitation, one or more end stations, mobile internet devices, smart phones, media devices, input/output (I/O) devices, tablet computers, appliances, intermediate stations, network interfaces, clients, servers, and/or portions thereof. In this embodiment, a "network" may be or comprise any mechanism, instrumentality, modality, and/or portion thereof that permits, facilitates, and/or allows, at least in part, two or more entities to be communicatively coupled together. Also in this embodiment, a first entity may be "communicatively coupled" to a second entity if the first entity is capable of transmitting to and/or receiving from the second entity one or more commands and/or data. In this embodiment, a "wireless network" may mean a network that permits, at least in part, at least two entities to be wirelessly communicatively coupled, at least in part. In this embodiment, a "wired network" may mean a network that permits, at least in part, at least two entities to be communicatively coupled, at least in part, non-wirelessly. In this embodiment, data and information may be used interchangeably, and may be or comprise one or more commands (for example one or more program instructions), and/or one or more such commands may be or comprise data and/or information. Also in this embodiment, an "instruction" may include data and/or one or more commands.

Host 10 may comprise circuit board (CB) 74 and circuit card (CC) 75. In this embodiment, CB 74 may comprise, for example, a system motherboard that may be physically and communicatively coupled to CC 75 via a not shown bus connector/slot system. CB 74 may comprise one or more single and/or multi-core host processors (HP) 12 and computer-readable/writable memory 21. Although not shown in the Figures, CB 74 also may comprise one or more chipsets (comprising, e.g., memory, input/output controller circuitry, and/or network interface controller (NIC) circuitry). One or more host processors 12 may be communicatively coupled via the one or more chipsets to memory 21 and CC 75. CC 75 may comprise NIC circuitry 118.

Alternatively or additionally, although not shown in the Figures, some or all of circuitry 118 and/or the functionality and components thereof may be comprised in, for example, CB 74 (e.g., in one or more host processors 12 and/or the one or more not shown chipsets). Also alternatively, one or more host processors 12, memory 21, the one or more not shown chipsets, and/or some or all of the functionality and/or components thereof may be comprised in, for example, circuitry 118 and/or CC 75. Many other alternatives are possible without departing from this embodiment.

As shown in FIG. 1, host 20 may comprise NIC circuitry 118' that may be capable of carrying out operations that may be identical or substantially similar to the respective operations that may be carried out by circuitry 118, and vice versa. Although not shown in the Figures, host 20 may comprise, in whole or in part, other respective components and/or functionality that may be similar or identical, at least in part, to the other respective components of host 10. As used herein, "circuitry" may comprise, for example, singly or in any combination, analog circuitry, digital circuitry, hardwired circuitry, programmable circuitry, co-processor circuitry, state machine circuitry, and/or memory that may comprise program instructions that may be executed by programmable circuitry. Also in this embodiment, a processor, processor core, core, and controller each may comprise respective circuitry capable of performing, at least in part, one or more arithmetic and/or logical operations, such as, for example, one or more respective central processing units. Also in this embodiment, a chipset may comprise circuitry capable of communicatively coupling, at least in part, two or more of the following: one or more host processors, storage, mass storage, one or more nodes, and/or memory. Although not shown in the Figures, host 10 may comprise a graphical user interface system. The not shown graphical user interface system may comprise, e.g., a respective keyboard, pointing device, and display system that may permit a human user to input commands to, and monitor the operation of, host 10, host 20, and/or system 100.

Memory 21 may comprise one or more of the following types of memories: semiconductor firmware memory, programmable memory, non-volatile memory, read only memory, electrically programmable memory, random access memory, flash memory, magnetic disk memory, optical disk memory, one or more random access memory cells (e.g., embedded in one or more integrated circuit chips that may implement at least in part controller and/or switch functionality), and/or other or later-developed computer-readable and/or writable memory. One or more machine-readable program instructions may be stored in memory 21 and/or circuitry 118. In operation of node 10, these instructions may be accessed and executed by one or more host processors 12 and/or circuitry 118. When executed by one or more host processors 12 and/or circuitry 118, these one or more instructions may result in one or more host processors 12, circuitry 118, and/or one or more components thereof, performing operations described herein as being performed by these components of system 100.

In an embodiment, a portion, subset, or fragment of an entity may comprise all of, more than, or less than the entity. Also in an embodiment, a packet or frame may comprise one or more symbols and/or values. Additionally, in an embodiment, a value may be "predetermined" if the value, at least in part, and/or one or more algorithms, operations, and/or processes involved, at least in part, in generating and/or producing the value is predetermined, at least in part. In an embodiment, a switch may be or comprise an entity capable of receiving a frame and/or frame fragment via one or more ports of the switch, and forwarding at least a portion of the frame and/or frame fragment via one or more other ports of the switch toward a destination of the frame or frame fragment. In an embodiment, a port may comprise circuitry capable of receiving, at least in part, storing, at least in part, and/or transmitting, at least in part, a packet.

Circuitry 118 may exchange data and/or commands with circuitry 118' of host 20 via one or more networks 50 in accordance with one or more communication protocols. For example, in this embodiment, these one or more protocols may be compatible with, e.g., one or more Ethernet and/or Transmission Control Protocol/Internet Protocol (TCP/IP) protocols.

For example, one or more Ethernet protocols that may be utilized in system 100 may comply or be compatible with Institute of Electrical and Electronics Engineers, Inc. (IEEE) Std. 802.3-2008, Dec. 26, 2008 (including, for example, Annex 31B entitled "MAC Control Pause Operation"); IEEE Std. 802.1Q-2005, May 19, 2006; IEEE Draft Standard P802.1Qau/D2.5, Dec. 18, 2009; IEEE Draft Standard P802.1Qaz/D1.2, Mar. 1, 2010; IEEE Draft Standard P802.1Qbb/D1.3, Feb. 10, 2010. The TCP/IP protocol that may be utilized in system 100 may comply or be compatible with the protocols described in Internet Engineering Task Force (IETF) Request For Comments (RFC) 791 and 793, published September 1981. Many different, additional, and/or other protocols (including, for example, those stated above) may be used for such data and/or command exchange without departing from this embodiment (e.g., earlier and/or later-developed versions of the aforesaid, related, and/or other protocols).

Figure 6:
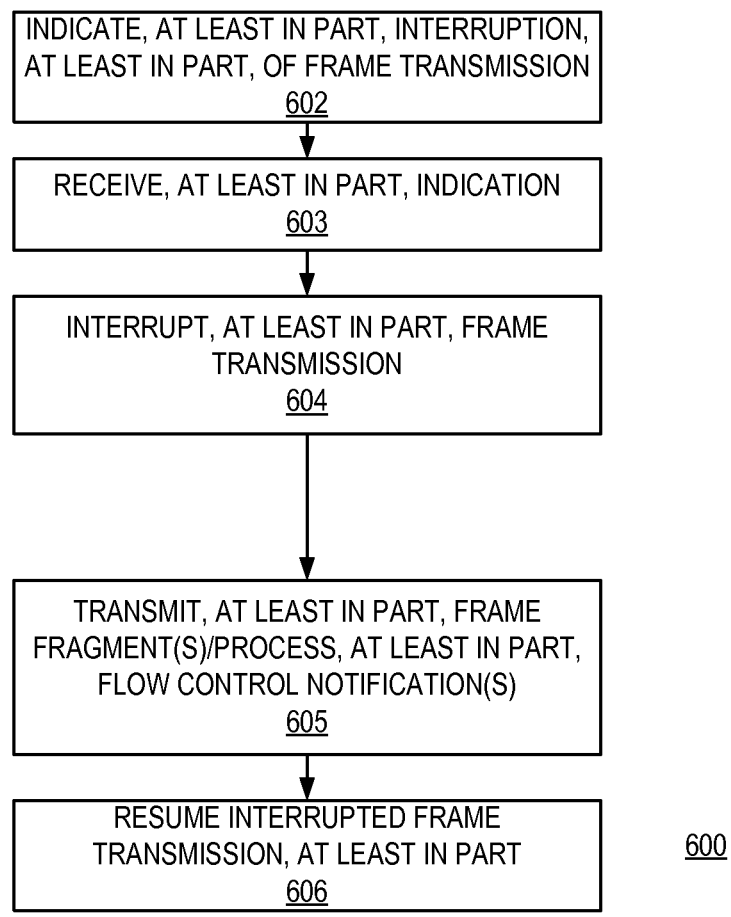
FIG. 6 illustrates operations in an embodiment.

FIG. 6 illustrates operations 600 that may be carried out in embodiment. After, for example, a reset of host 10, host 20, system 100, and/or re-establishment of communication between host 10 and host 20 via network 50, circuitry 118 of host 10 and circuitry 118' of host 20 may exchange (e.g., send and/or receive) one or more (e.g., three) respective control frames (CF) 70. The exchange of these one or more respective control frames may permit, enable, and/or indicate, at least in part, the capability, at least in part, of circuitry 118, host 10, circuitry 118', and/or host 20 to interrupt (e.g., suspend, at least temporarily and/or at least in part) the transmission (e.g., on-going transmission), at least in part, of one or more frames (F) 40 of relatively lower priority in favor of the transmission, at least in part, of one or more portions (e.g., payload (PL) 54 and/or one or more other portions) of one or more other frames 52 of relatively higher priority. In this embodiment, a payload may comprise one or more portions of a frame, such as, for example, one or more portions of a payload of an Ethernet frame, IP packet, and/or TCP packet.

Figure 2:
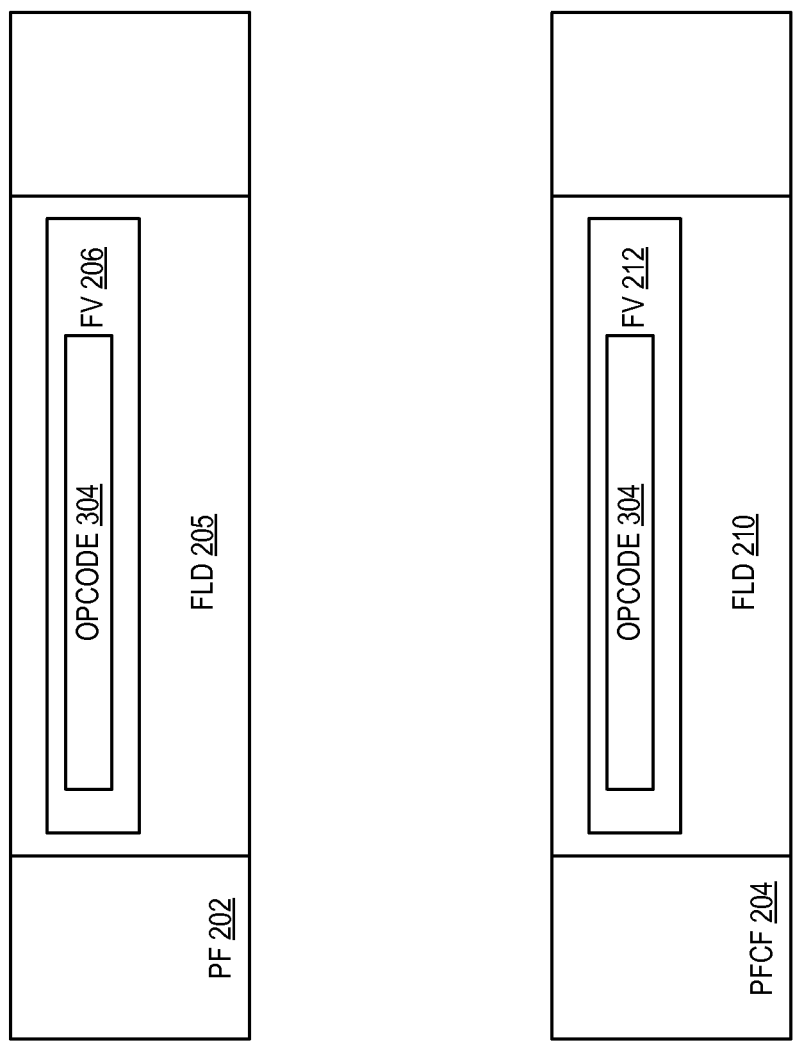
FIG. 2 illustrates features of certain types of frames in an embodiment.

For example, as shown in FIG. 2, in this embodiment, the one or more respective control frames 70 may be or comprise one or more Ethernet control pause frames (PF) 202 of a type compatible with IEEE Std. 802.3-2008, Annex 31B, Dec. 26, 2008, and/or Ethernet priority flow control frames (PFCF) 204 of a type compatible with IEEE Draft Standard P802.1Qbb/D1.3, Feb. 10, 2010. In this embodiment, one or more PF 202 and/or one or more PFCF 204 may comprise respective Ethernet type fields (not shown) that comprise the value 0x8808 (i.e., 8808 hexadecimal). Also in this embodiment, one or more PF 202 and/or one or more PFCF 204 may comprise respective MAC control opcode fields (FLD) 205 and 210. These control opcode fields 205 and 210 may comprise one or more respective predetermined field values (FV) 206 and 212. These predetermined field values 206 and 212 may comprise one or more predetermined reserved opcodes 304 (e.g., 0x0202). In this embodiment, the one or more predetermined opcodes 304 may designate one or more PF 202 and/or PFCF 204 as special control frames whose receipt may enable and/or indicate, at least in part, (1) the capability to interrupt transmission, at least in part, of one or more frames 40 in favor of transmitting, at least in part, one or more portions of one or more frames 52, and/or (2) that such interruption presently is being initiated. Alternatively or additionally, without departing from this embodiment, such enablement and/or indication may be made, at least in part, by receipt of one or more predetermined and/or reserved type-length-values (TLV) used, for example, in Data Center Bridging Exchange (DCBX) protocol compatible with IEEE Draft Standard P802.1Qaz/D1.2, Mar. 1, 2010.

After such capability has been permitted, enabled, and/or indicated, at least in part, circuitry 118 may commence sending, at least in part, one or more frames 40 to circuitry 118' of host 20 (e.g., circuitry 118' and/or host 20 may be an intended recipient of one or more frames 40) via one or more networks 50. Prior to completely transmitting all of one or more frames 40 to circuitry 118' of host 20, circuitry 118 may indicate, at least in part, to circuitry 118' and/or host 20 the interruption, at least in part, of the transmission, at least in part, by circuitry 118 and/or host 10 to circuitry 118' and/or host 20 of one or more frames 40 in favor of (1) transmitting, at least in part, in one or more frame fragments (FF) 60, one or more portions (e.g., payload 54) of one or more other frames 52 to host 20 and/or (2) processing, at least in part, one or more incoming flow control notifications (FCN) 71 by, e.g., host 10 and/or host 20 (see operation 602 in FIG. 6). Circuitry 118 may indicate this, at least in part, by issuing, at least in part, one or more additional CF 70 to circuitry 118' in host 20 via one or more networks 50. Circuitry 118' may receive, at least in part, the one or more additional CF 70, and in so doing, may receive, at least in part, such indication, as illustrated by operation 603 in FIG. 6. After or contemporaneous with, at least in part, the execution of operations 602 and/or 603, the transmission, at least in part, by circuitry 118 and/or host 10 to circuitry 118' and/or host 20 of one or more frames 40 may be interrupted, at least in part. Thus, in this embodiment, circuitry 118 and/or circuitry 118' may permit the interruption, at least in part, of the transmission, at least in part, of one or more frames 40 from circuitry 118 and/or host 10 to circuitry 118' and/or host 20 in favor of (1) transmitting, at least in part, in one or more frame fragments (FF) 60, one or more portions (e.g., payload 54) of one or more other frames 52 to host 20 and/or (2) processing, at least in part, one or more incoming flow control notifications 71. In this embodiment, an entity may be said to "permit" an event or occurrence if the entity may be capable, at least in part, of facilitating, enabling, implementing, requesting, instructing, commanding, and/or executing, at least in part, one or more operations that may result in, at least in part, the event or occurrence.

In this embodiment, the transmission, at least in part, of each respective additional CF 70 may be associated and/or interleaved with a single respective frame fragment (e.g., per each user priority level and per each respective communication link, in parallel). If additional CF 70 are received by circuitry 118' in excess of these limitations, this may result in the resetting by circuitry 118' of frame recollection with respect to the associated priority level. However, without departing from this embodiment, multiple frame fragments may be associated with a single respective additional CF 70, or vice versa. Also in this embodiment, the transmission of one or more frames 40 may be interrupted such that the payload of one or more frames 40 that may remain to be transmitted by host 10 is both (1) greater than the minimum Ethernet payload length (e.g., 46 bytes) and (2) accommodates the buffering that may be implemented in system 100. As a result of the latter consideration, in this embodiment, such remaining payload may be less than the difference between the maximum permitted payload size (e.g., 9000 bytes in the case of a jumbo Ethernet frame or 1500 bytes in the case of an ordinary Ethernet frame) and 250 bytes. Of course, the above is merely exemplary and may vary without departing from this embodiment.

After execution, at least in part, of operation 602, operation 603, and/or operation 604, circuitry 118 may (1) transmit, at least in part, to circuitry 118' via one or more networks 50, one or more FF 60, and/or (2) circuitry 118, circuitry 118', host 10, and/or host 20 may process, at least in part, one or more flow control notifications 71 (see operation 605 in FIG. 6). One or more FF 60 may comprise one or more respective portions of PL 54 and one or more predetermined values (PV) 74. One or more PV 74 may indicate, at least in part, to circuitry 118' and/or host 20 that one or more FF 60 are, in fact, one or more FF 60. Circuitry 118 may receive, at least in part, payload 54 from memory 21 via one or more direct memory access operations. Alternatively or additionally, circuitry 118 may receive, at least in part, payload 54 via other types of data transfer operations and/or from other components in system 100.

Figure 3:
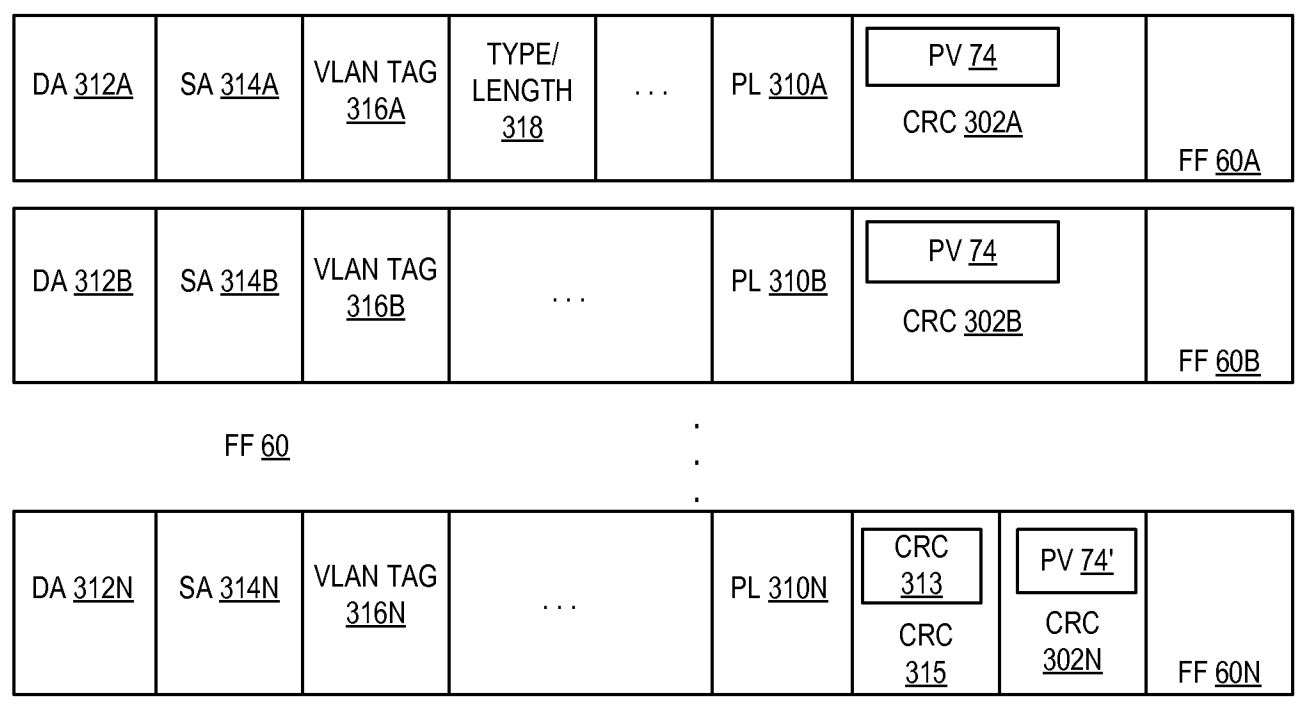

As shown in FIG. 3, depending upon, for example, the size of payload 54, one or more FF 60 may comprise multiple FF 60A, 60B, . . . 60N. Of course, the number and sizes of these FF 60A, 60B, . . . 60N, and/or the specific contents and/or fields comprised in FF 60A, 60B . . . 60N, may vary without departing from this embodiment. In this example, the first FF 60A to be transmitted by circuitry 118 may comprise one or more destination addresses (DA) 312A, one or more source addresses (SA) 314A, one or more virtual local area network (VLAN) tags 316A, one or more Ethernet type/length values 318, payload (PL) 310A, and/or one or more cyclical redundancy check (CRC) fields 302A. One or more destination addresses 312A may designate and/or identify, at least in part, circuitry 118' and/or host 20. One or more source addresses 314A may designate and/or identify, at least in part, circuitry 118 and/or host 10. One or more VLAN tags 316A may designate and/or identify, at least in part, one or more virtual area networks (not shown) that may comprise, at least in part, circuitry 118' and/or host 20. One or more tags 316A may be compatible with IEEE Std. 802.1Q-2005, May 19, 2006. One or more Ethernet type/length values 318 may indicate, at least in part, the type of Ethernet frame 40 and the sum of the lengths of FF 60A, 60B . . . 60N. Payload 310A may comprise a respective portion of payload 54. One or more CRC fields 302A may comprise, at least in part, one or more PV 74.

In this example, one or more PV 74 may be or comprise one or more incorrect (e.g., erroneous and/or invalid) CRC values for the one or more frame fragments (e.g., FF 60A) that comprise the one or more incorrect CRC values. For example, the one or more incorrect CRC values may be or comprise a predetermined, reserved, incorrect CRC value such as 0xA5A5A5A5, although many alternate values are possible without departing from this embodiment. For example, if (e.g., by coincidence) the correct CRC value for a given frame fragment is equal to 0xA5A5A5A5, one or more PV 74 may comprise one or more different predetermined values, such as, 0xAAAAAAAA. Many other and/or alternative values are possible, without departing from this embodiment. In this example, this predetermined, incorrect CRC value may indicate (e.g., signal) to circuitry 118' and/or host 20 that circuitry 118' has received one or more frame fragments 60A (e.g., in contradistinction to having received an ordinary Ethernet frame).

In this example, one or more subsequent FF 60B may comprise one or more destination addresses 312B, one or more source addresses 314B, one or more VLAN tags 316B, one or more CRC fields 302B, and/or one or more PV 74 whose function and/or contents may be identical or analogous to those of one or more destination addresses 312A, one or more source addresses 314A, one or more VLAN tags 316A, one or more CRC fields 302A, and/or one or more PV 74, respectively. Payload 310B may comprise another respective portion of payload 54.

In this example, the one or more final frame fragments (e.g., FF 60N) comprised in one or more FF 60 may comprise one or more destination addresses 312N, one or more source addresses 314N, one or more VLAN tags 316N, and/or one or more CRC fields 302N, whose function and/or contents may be identical or analogous to those of one or more destination addresses 312A, one or more source addresses 314A, one or more VLAN tags 316A, and one or more CRC fields 302A, respectively. In the one or more final FF 60N, one or more CRC fields 302N may comprise, at least in part, one or more predetermined values 74'. One or more PV 74' may be or comprise one or more incorrect CRC values for the one or more final FF 60N. For example, these one or more incorrect CRC values may be or comprise a predetermined, reserved, incorrect CRC value such as 0xA9A9A9A9, although many alternate values are possible without departing from this embodiment. For example, if (e.g., by coincidence) the correct CRC value for a given final frame fragment is equal to 0xA9A9A9A9, one or more PV 74' may comprise one or more different predetermined values, such as, 0xA6A6A6A6. Many other and/or alternative values are possible, without departing from this embodiment. In this example, this predetermined, incorrect CRC value may be different from that which may be comprised in PV 74, and may indicate (e.g., signal) to circuitry 118' and/or host 20 that circuitry 118' has received the one or more final frame fragments 60N in FF 60. One or more final FF 60N also may comprise one or more other CRC fields 315 that may contain, at least in part, one or more accumulated CRC values 313. One or more accumulated CRC values 313 may be or comprise, at least in part, an accumulated CRC value for the one or more FF 60 that would have been the correct CRC value for frame 52. For example, this accumulated CRC value may be calculated based at least in part upon (1) the entire contents, except for the contents of one or more CRC fields 302A, of the first one or more FF 60A, and (2) the respective payloads of the other frame fragments (i.e., other than the first one or more FF 60A) in FF 60.

Alternatively or additionally, one or more PV 74' and/or one or more CRC fields 302N may comprise one or more valid CRC values for the one or more final FF 60N. Other alternatives and/or additions are possible.

For example, alternatively or additionally, one or more PV 74 in one or more CRC fields 302A in the first one or more FF 60A may comprise one or more inverted CRC values for the first one or more FF 60A. In this embodiment, an inverted CRC value of or for an entity may be or comprise a logical (e.g., Boolean) negation and/or arithmetic negation (e.g., one and/or two's complement) of a valid CRC value computed for the entity. In this embodiment, such an inverted CRC value may be generated based at least in part upon an algorithm that has an appropriately remote probability of collision with the actual valid CRC for the entity. Additionally or alternatively, one or more intermediate FF (e.g., one or more FF 60B) may comprise in one or more CRC fields 302B one or more inverted CRC values for the one or more intermediate FF 60B and/or and one or more inverted accumulated CRC values for one or more intermediate FF 60B and one or more preceding FF (e.g., one or more FF 60A). Further additionally or alternatively, one or more CRC values 313 may be or comprise, at least in part, an inverted accumulated CRC value for the one or more FF 60 (e.g., an inversion of the correct CRC value for frame 52), and/or one or more CRC fields 302N may be eliminated. Advantageously, by using such inverted and/or accumulated CRC values, the number and/or complexity of CRC calculating and/or validating circuitry modules may be reduced.

Figure 7:
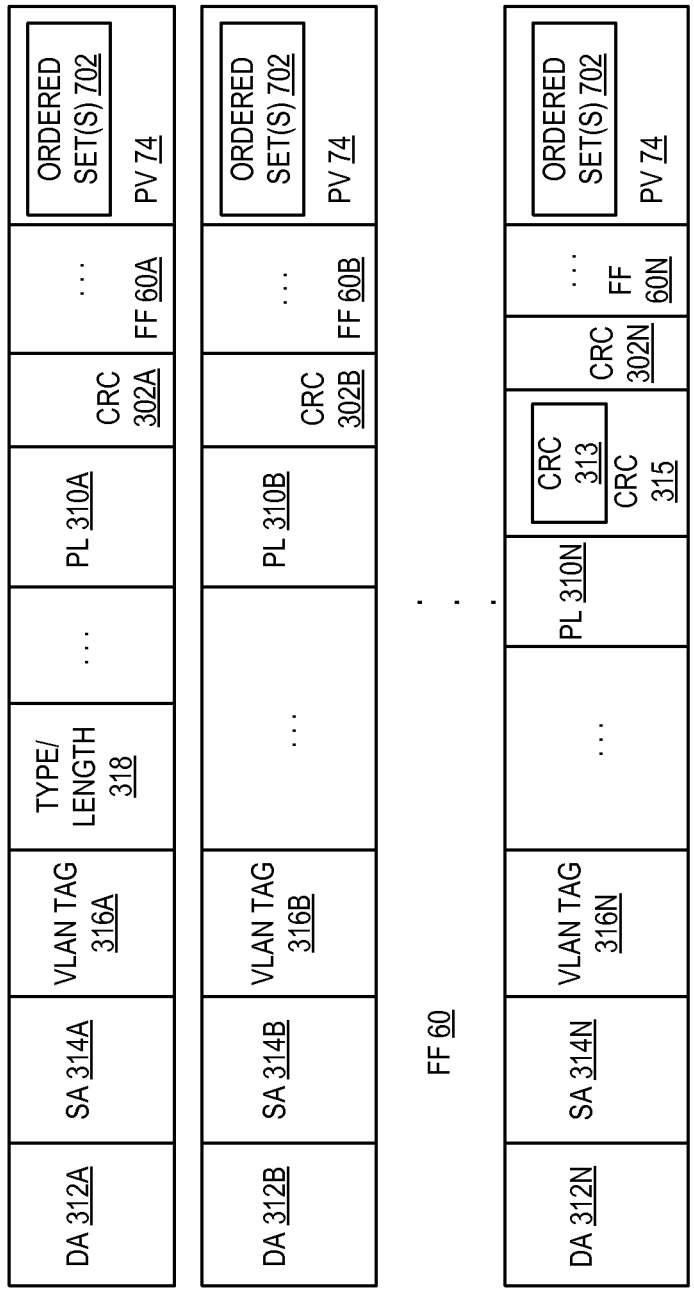
FIG. 7 illustrates features of certain types of frame fragments in an embodiment.

Turning to FIG. 7, also additionally or alternatively, the respective one or more CRC fields 302A, 302B, . . . 302N in the respective FF 60A, 60B, . . . 60N may be or comprise, at least in part, one or more respective valid CRC values for the one or more respective FF 60A, 60B, . . . 60N. In this arrangement shown in FIG. 7, each of the respective FF 60A, 60B, . . . 60N may comprise, at least in part, one or more predetermined values 74 that may comprise one or more respective layer-1 end-of-fragment order sets 702. The respective ordered sets 702 may be and/or comprise one or more respective predetermined sequences of symbols and/or values that may indicate, at least in part, the respective end of a respective frame fragment.

Figure 4:
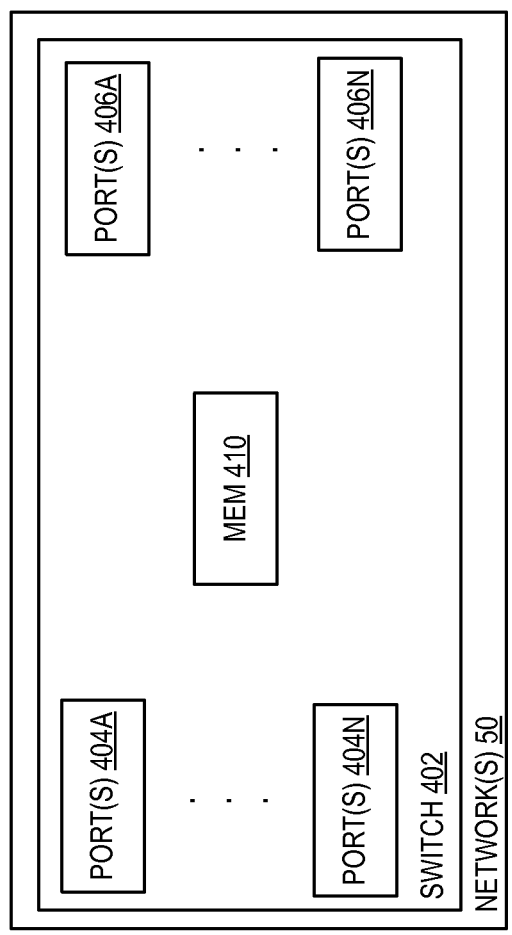
FIG. 4 illustrates features of a switch in an embodiment.

With reference now to FIG. 4, one or more networks 50 may comprise one or more switches, such as, for example, switch 402. As shown in FIG. 4, switch 402 may comprise one or more (and in this embodiment, a plurality of) ingress ports 404A 404N, one or more (and in this embodiment, a plurality of) egress ports 406A . . . 406N, and memory 410. In operation of system 100, circuitry 118 in host 10 may transmit, at least in part, via switch 402, one or more FF 60 to circuitry 118' in host 20. In this embodiment, an ingress port may be a port capable of receiving, at least in part, one or more frames and/or frame fragments. Also in this embodiment, an egress ports may be a port capable of transmitting, at least in part, one or more frames and/or frame fragments. Switch 402 and/or ingress ports 404A . . . 404N may be capable of operating in a plurality of modes, including, for example, a cut-through mode of operation and/or a store-and-forward mode of operation, with respect to the respective egress ports 406A . . . 406N. In an embodiment, in cut-through mode of operation, a frame or frame fragment received, at least in part, at an ingress port may be transmitted, at least in part, from an egress port (e.g., for purposes of forwarding the frame or frame fragment from the switch), in a manner such that the transmission from the egress port of frame or frame fragment may begin prior to the frame or frame fragment being completely received by the ingress port. In an embodiment, in cut-through mode, once transmission from an ingress port to an egress port has commenced, such transmission may not be interrupted. In an embodiment, in store-and-forward mode of operation, a frame or frame fragment received, at least in part, at an ingress port, is first received and/or stored, at least temporarily, in memory 410 prior to being transmitted to an egress port (e.g., for purposes of being forwarded from the switch). Subject to the following, in this embodiment, switch 402 may be capable of operating in a respective one of these two modes of operation on a separate respective individual ingress port, egress port, and/or user priority level basis. However, in this embodiment, in cut-through mode of operation, a respective ingress port that has a relatively lower link speed may not transmit one or more frames or frame fragments to a respective egress port that has a relatively higher link speed. Also in this embodiment, cut-through mode of operation may be enabled or disabled on a separate respective user priority level and/or internal forwarding path (e.g., respective internal transmission path within the switch from a respective ingress port to a respective egress port of the switch) basis.

Prior to receiving, at least in part, the first one or more FF 60A, ingress ports 404A . . . 404N and/or switch 402 may operate in a cut-through mode of operation with respect to one or more egress ports 406A via which one or more FF 60 may be transmitted, at least in part, to circuitry 118' in host 20. However, after one or more ingress ports (e.g., 404A) receive, at least in part, the first one or more FF 60A, the ingress ports 404A . . . 404N and/or switch 402 may operate, at least temporarily, in a store-and-forward mode of operation, for any further frame fragments of the same user priority level received by the switch 402, at least with respect to these one or more egress ports 406A. As a result, these one or more egress ports 406A may immediately receive, at least in part, the first one or more FF 60A from one or more ingress ports 404A, and may forward them, at least in part, to the circuitry 118'. However, while in this store-and-forward mode of operation, any additional frame fragments of the same priority level (e.g., FF 60B . . . 60N, and/or other frame fragments of the same priority level that may not be comprised in one or more FF 60) that may be received by switch 404 and are to be transmitted to one or more egress ports 406A may be first completely received and stored, at least temporarily, in memory 410, prior to being transmitted to one or more egress ports 406A for forwarding from the switch 404. Also, while in this store-and-forward mode of operation, in the event that the next succeeding frame fragment (e.g., 60B) is not yet available for transmission from one or more egress ports 406A but the user priority level of that frame fragment is presently scheduled for transmission from one or more egress ports 406A, a different frame or frame fragment belonging to a different flow, but of the same priority level, may instead be transmitted by one or more egress ports 406A. The transmission by one or more egress ports 406A of this different frame and/or frame fragment also may itself be interrupted, at least in part, in accordance with the foregoing teachings, in favor of a relatively higher priority level frame.

Figure 5:
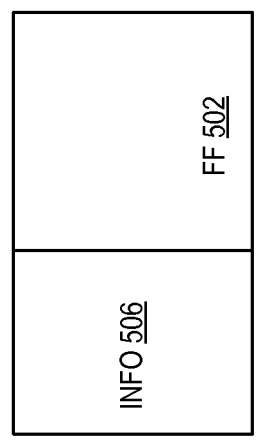
FIG. 5 illustrates features of certain types of frame fragments in an embodiment.
Figure 5:
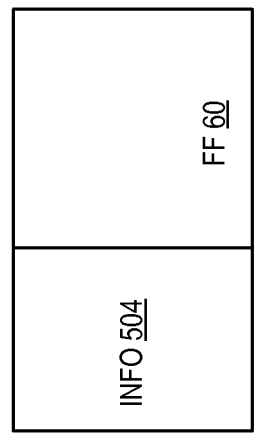

For example, as shown in FIG. 5, one or more FF 60 may comprise flow information 504, and one or more FF 502 (not comprised in one or more FF 60) may comprise flow information 506. Flow information 504 may comprise, for example, the information comprised in and/or indicated by the values in one or more destination addresses 312A, one or more source addresses 314A, and/or one or more VLAN tags 316A. Flow information 506 may comprise analogous information, but corresponding to a different flow. One or more VLAN tags 316A may include quality of service information that may correspond to and/or indicate, at least in part, the user priority level of one or more FF 60. Likewise, flow information 506 may comprise analogous VLAN tag information that may indicate, in this example, an identical user priority level to that of one or more FF 60. In carrying out the foregoing operations, switch 402, ingress ports 404A . . . 404N, and/or egress ports 406A . . . 406N may distinguish, at least in part, between respective frame fragments and/or respective frames belonging to different flows and/or priority levels, based at least in part, upon these types of flow and/or user priority level information in the frame fragments and/or frame fragments. For example, such respective flow information and/or respective user priority level information may identify, at least in part, one or more respective flows and/or one or more respective priority levels to which the respective frames and/or frame fragments may belong. Host 10 and/or host 20 also may utilize such flow and/or user priority level information in order to distinguish, at least in part, between frames and/or frame fragments that belong to different respective flows and/or priority levels.

Of course, as will be appreciated, without departing from this embodiment, the particular type or types of information comprised in such flow information may not be limited to source/destination address and/or VLAN information, but may vary. For example, as stated previously, one or more communication protocols other than and/or in addition to Ethernet and/or TCP/IP protocols may be utilized in system 100. If one or more such other and/or additional protocols are used in system 100, the particular types, parameters, and/or characteristics of such flow information may vary, without departing from this embodiment. Also, for example, in store-and-forward mode of operation, respective priority levels may be used to differentiate between respective local flows transmitted via partners of the same respective link, and minimal differentiation that relies upon grouping user priorities into two respective groups may be used. Additionally, if a single respective physical link in system 100 is used to carry a plurality of virtual links, the teachings of this embodiment may be applied to each respective virtual link.

In this embodiment, switch 402 may carry out the foregoing operations in such a way as to permit frame fragments that belong to the same respective flow to be routed to their destination via the same respective path. In order to facilitate this, in one possible implementation of this embodiment, in carrying out the foregoing operations, switch 402 may permit a maximum of two respective sets of frame fragments of the same priority level (e.g., one or more FF 60 and one or more FF 502) to be transmitted from the same one or more egress ports while in this store-and-forward mode of operation. If the switch 402 detects that there are more than two such sets of frame fragments contemporaneously destined for transmission from the same one or more egress ports, switch 402 may reset all such transmissions belonging to that priority level, and cut-through operation may be resumed at least for such transmissions. Advantageously, the previously described operations of switch 402 may reduce recollection for flows belonging to identical respective priority levels. However, it should be appreciated that, without departing from this embodiment, there are many other and/or alternative ways to permit frame fragments that belong to the same respective flow to be routed to their destination via the same respective path. Accordingly, the foregoing should be viewed as an illustrative, non-limiting example.

Additionally, in the event that one or more fragments (e.g., one or more FF 60B) in a given set of frame fragments are dropped (e.g., due to errors, congestion, or recollection failure), switch 402 may forward to the next hop (e.g., host 20) a dummy final fragment that contains an invalid accumulated CRC value 313 (e.g., not valid according to the foregoing teachings of this embodiment). Advantageously, this may result in termination of recollection at the next hop.

Returning now to FIG. 6, as stated previously, as part of operation 605, circuitry 118, circuitry 118', host 10, and/or host 20 may process, at least in part, one or more flow control notifications 71. One or more notifications 71 may be received, at least in part, by circuitry 118, circuitry 118', host 10, and/or host 20, and may permit one or more flow control techniques (e.g., compatible with one or more communication protocols utilized in system 100) to be implemented, at least in part, by circuitry 118, circuitry 118', host 10, and/or host 20. Advantageously, by interrupting, at least in part, the transmission of one or more frames 40 in favor of the processing, at least in part, of one or more flow control notifications 71, this may permit, at least in part, such incoming flow control notifications 71 to be responded to and/or processed more quickly by circuitry 118, circuitry 118', host 10, and/or host 20.

After the one or more FF 60 have been transmitted, at least in part, by circuitry 118, and/or one or more flow control notifications 71 have been processed, at least in part (see operation 605), circuitry 118 may recommence, at least in part, transmission of the one or more frames 40 whose transmission has previously been interrupted (see operation 606 in FIG. 6). Circuitry 118' may receive, at least in part, and process, at least in part, one or more frame FF 60 and one or more frames 40. In the event that circuitry 118' detects an error in one or more FF 60 (e.g., one or more CRC related errors), circuitry 118' may signal this to circuitry 118, and circuitry 118 may reschedule one or more frames 52 for re-transmission.

Thus, an embodiment may include circuitry to permit interruption, at least in part, of transmission, at least in part, of a first frame from a sender to an intended recipient in favor of transmitting, at least in part, a payload of a second frame from the sender to the intended recipient, and/or processing, at least in part, one or more incoming flow control notifications. The payload may be transmitted, at least in part, to the intended recipient in one or more frame fragments. The circuitry may indicate, at least in part, the interruption of the transmission, at least in part, of the first frame, by issuing, at least in part, one or more control frames to the intended recipient. The one or more frame fragments may be indicated, at least in part, by one or more predetermined values comprised, at least in part, in the one or more frame fragments.

Advantageously, this embodiment may reduce the latency with which the information contained in a relatively higher priority frame (e.g., a low latency frame) may be received by the intended recipient in a converged Ethernet network. Further advantageously, this embodiment may permit the amount of buffer memory allocated in such a network to be reduced. Furthermore, this embodiment may not adversely affect network reliability and may permitting flow control techniques to be implemented in the network. Also advantageously, this embodiment may be compatible with existing and/or proposed Ethernet standards, may not involve use of timeouts, and may not implement frame fragment numbering for recollection.

Many variations, modifications, and alternatives are possible without departing from this embodiment. For example, in this embodiment, the interruption, at least in part, of the transmission, at least in part, of the first frame may be indicated via one or more out-of-band messages (e.g., transmitted via one or more not shown separate out-of-band wired and/or wireless communication links). Accordingly, this embodiment should be viewed broadly as encompassing all such alternatives, modifications, and alternatives.

What is claimed is:

1. An apparatus comprising:
circuitry to permit interruption, at least in part, of transmission, at least in part, of a first frame from a sender to an intended recipient in favor of
transmitting, at least in part, a payload of a second frame from the sender to the intended recipient, the payload to be transmitted, at least in part, to the intended recipient in one or more frame fragments;
the circuitry to indicate to the intended recipient receipt of the one or more frame fragments instead of the first frame by including in one or more cyclical redundancy check (CRC) fields in the one or more frame fragments one or more predetermined reserved values that are not equal to one or more correct CRC values for the one or more frame fragments, the one or more frame fragments comprising a final frame fragment that comprises both one or more final frame fragment CRC fields and one or more additional final frame fragment CRC fields, the one or more final frame fragment CRC fields comprising another predetermined reserved value that is not equal to the one or more predetermined reserved values and also is not equal to a correct final frame fragment CRC value for the final frame fragment, the one or more additional final frame fragment CRC fields comprising a correct accumulated CRC value for the second frame, the another predetermined reserved value being to indicate to the intended recipient that the intended recipient has received the final frame fragment instead of another frame fragment.

2. The apparatus of claim 1, wherein:
the circuitry is to indicate, at least in part, the interruption of the transmission, at least in part, of the first frame, by issuing, at least in part, one or more control frames to the intended recipient;
the one or more control frames comprise at least one of:
one or more Ethernet pause frames;
one or more Ethernet priority flow control frames; and
the one or more control frames comprise one or more field values that indicate, at least in part, that the transmission, at least in part, of the first frame is to be interrupted in favor of the transmitting, at least in part, of the payload.

3. The apparatus of claim 2, wherein:
the one or more field values comprise one or more predetermined op codes.

4. The apparatus of claim 1, wherein:
the sender is to transmit, at least in part, the one or more frame fragments to the intended recipient via a switch;
the switch includes ingress ports and an egress port, at least one of the ingress ports to receive, at least in part, the one or more frame fragments, the egress port to send, at least in part, the one or more frame fragments to the intended recipient;
prior to receiving a first one of the one or more frame fragments, the ingress ports are to operate in a cut-through mode of operation with respect to the egress port; and
after receiving the first one of the one or more frame fragments, the ingress ports are to operate in a store-and-forward mode of operation with respect to the egress port.

5. The apparatus of claim 4, wherein:
the switch is to transmit, at least in part, one or more other frame fragments;
one or more other frame fragments have an identical priority as the second frame; and
the switch is to distinguish, at least in part, between the frame fragments based at least in part upon respective information comprised in the frame fragments, the respective information identifying, at least in part, one or more respective flows.

6. The apparatus of claim 1, wherein:
a circuit card includes, at least in part, the circuitry;
the circuit card is to be coupled to a circuit board in a first host;
the circuit board includes memory and a host processor; and
the circuitry is to receive, at least in part, the payload from the memory via one or more direct memory access operations.

7. The apparatus of claim 1, wherein:
the circuitry is to indicate, at least in part, the interruption of the transmission, at least in part, of the first frame, by issuing, at least in part, one or more control frames to the intended recipient; and
the one or more frame fragments also comprise one or more other CRC fields that contain, at least in part, one or more accumulated CRC values for the one or more frame fragments.

8. The apparatus of claim 1, wherein:
the circuitry is to indicate, at least in part, the interruption of the transmission, at least in part, of the first frame, by issuing, at least in part, one or more control frames to the intended recipient;
the one or more predetermined values comprise at least one of:
one or more ordered sets; and
one or more inverted cyclical redundancy check values.

9. Non-transitory computer-readable memory storing one or more instructions that when executed by a machine result in performance of operations comprising:

permitting interruption, at least in part, of transmission, at least in part, of a first frame from a sender to an intended recipient in favor of transmitting, at least in part, a payload of a second frame from the sender to the intended recipient, the payload to be transmitted, at least in part, to the intended recipient in one or more frame fragments; and indicating to the intended recipient receipt of the one or more frame fragments instead of the first frame by including in one or more cyclical redundancy check (CRC) fields in the one or more frame fragments one or more predetermined reserved values that are not equal to one or more correct CRC values for the one or more frame fragments, the one or more frame fragments comprising a final frame fragment that comprises both one or more final frame fragment CRC fields and one or more additional final frame fragment CRC fields, the one or more final frame fragment CRC fields comprising another predetermined reserved value that is not equal to the one or more predetermined reserved values and also is not equal to a correct final frame fragment CRC value for the final frame fragment, the one or more additional final frame fragment CRC fields comprising a correct accumulated CRC value for the second frame, the another predetermined reserved value being to indicate to the intended recipient that the intended recipient has received the final frame fragment instead of another frame fragment.

10. The non-transitory computer-readable memory of claim 9, wherein:

the operations also comprise indicating, at least in part, the interruption of the transmission, at least in part, of the first frame, by issuing, at least in part, one or more control frames to the intended recipient;

the one or more control frames comprise at least one of:
one or more Ethernet pause frames;
one or more Ethernet priority flow control frames; and the one or more control frames comprise one or more field values that indicate, at least in part, that the transmission, at least in part, of the first frame is to be interrupted in favor of the transmitting, at least in part, of the payload.

11. The non-transitory computer-readable memory of claim 10, wherein:

the one or more field values comprise one or more predetermined op codes.

12. The non-transitory computer-readable memory of claim 9, wherein:

the sender is to transmit, at least in part, the one or more frame fragments to the intended recipient via a switch;

the switch includes ingress ports and an egress port, at least one of the ingress ports to receive, at least in part, the one or more frame fragments, the egress port to send, at least in part, the one or more frame fragments to the intended recipient;

prior to receiving a first one of the one or more frame fragments, the ingress ports are to operate in a cut-through mode of operation with respect to the egress port; and after receiving the first one of the one or more frame fragments, the ingress ports are to operate in a store-and-forward mode of operation with respect to the egress port.

13. The non-transitory computer-readable memory of claim 12, wherein:

the switch is to transmit, at least in part, one or more other frame fragments;

one or more other frame fragments have an identical priority as the second frame; and the switch is to distinguish, at least in part, between the frame fragments based at least in part upon respective information comprised in the frame fragments, the respective information identifying, at least in part, one or more respective flows.

14. The non-transitory computer-readable memory of claim 9, wherein:

a circuit card includes, at least in part, circuitry to perform, at least in part, the operations;

the circuit card is to be coupled to a circuit board in a first host;

the circuit board includes memory and a host processor; and the circuitry is to receive, at least in part, the payload from the memory via one or more direct memory access operations.

15. The non-transitory computer-readable memory of claim 9, wherein:

the operations also comprise indicating, at least in part, the interruption of the transmission, at least in part, of the first frame, by issuing, at least in part, one or more control frames to the intended recipient; and the one or more frame fragments also comprise one or more other CRC fields that contain, at least in part, one or more accumulated CRC values for the one or more frame fragments.

16. A method comprising:

permitting interruption, at least in part, of transmission, at least in part, of a first frame from a sender to an intended recipient in favor of transmitting, at least in part, a payload of a second frame from the sender to the intended recipient, the payload to be transmitted, at least in part, to the intended recipient in one or more frame fragments; and indicating to the intended recipient receipt of the one or more frame fragments instead of the first frame by including in one or more cyclical redundancy check (CRC) fields in the one or more frame fragments one or more predetermined reserved values that are not equal to one or more correct CRC values for the one or more frame fragments, the one or more frame fragments comprising a final frame fragment that comprises both one or more final frame fragment CRC fields and one or more additional final frame fragment CRC fields, the one or more final frame fragment CRC fields comprising another predetermined reserved value that is not equal to the one or more predetermined reserved values and also is not equal to a correct final frame fragment CRC value for the final frame fragment, the one or more additional final frame fragment CRC fields comprising a correct accumulated CRC value for the second frame, the another predetermined reserved value being to indicate to the intended recipient that the intended recipient has received the final frame fragment instead of another frame fragment.

17. The method of claim 16, wherein:

the method also comprises indicating, at least in part, the interruption of the transmission, at least in part, of the first frame, by issuing, at least in part, one or more control frames to the intended recipient;

the one or more control frames comprise at least one of:
one or more Ethernet pause frames;
one or more Ethernet priority flow control frames; and the one or more control frames comprise one or more field values that indicate, at least in part, that the transmission, at least in part, of the first frame is to be interrupted in favor of the transmitting, at least in part, of the payload.

18. The method of claim 17, wherein:

the one or more field values comprise one or more predetermined op codes.

19. The method of claim 16, wherein:

the sender is to transmit, at least in part, the one or more frame fragments to the intended recipient via a switch;

the switch includes ingress ports and an egress port, at least one of the ingress ports to receive, at least in part, the one or more frame fragments, the egress port to send, at least in part, the one or more frame fragments to the intended recipient;

prior to receiving a first one of the one or more frame fragments, the ingress ports are to operate in a cut-through mode of operation with respect to the egress port; and after receiving the first one of the one or more frame fragments, the ingress ports are to operate in a store-and-forward mode of operation with respect to the egress port.

20. The method of claim 19, wherein:

the switch is to transmit, at least in part, one or more other frame fragments;

one or more other frame fragments have an identical priority as the second frame; and the switch is to distinguish, at least in part, between the frame fragments based at least in part upon respective information comprised in the frame fragments, the respective information identifying, at least in part, one or more respective flows.

21. The method of claim 16, wherein:

a circuit card includes, at least in part, circuitry to perform, at least in part, operations that implement the method;

the circuit card is to be coupled to a circuit board in a first host;

the circuit board includes memory and a host processor; and the circuitry is to receive, at least in part, the payload from the memory via one or more direct memory access operations.

22. The method of claim 16, wherein:

the method also comprises indicating, at least in part, the interruption of the transmission, at least in part, of the first frame, by issuing, at least in part, one or more control frames to the intended recipient; and the one or more frame fragments also comprise one or more other CRC fields that contain, at least in part, one or more accumulated CRC values for the one or more frame fragments.

* * * * *